United States Patent [19]

Fujita

[11] Patent Number: 4,930,012
[45] Date of Patent: May 29, 1990

[54] CIRCUIT FOR DETECTING MOTION IN A VIDEO SIGNAL ON THE BASIS OF DETECTED CORRELATION PATTERNS

[75] Inventor: Tadao Fujita, Kanagawa, Japan
[73] Assignee: Sony Corporation, Tokyo, Japan
[21] Appl. No.: 410,470
[22] Filed: Sep. 21, 1989
[30] Foreign Application Priority Data
Apr. 8, 1988 [JP] Japan .................................. 63-87821
[51] Int. Cl.$^5$ .............................................. H04N 7/18
[52] U.S. Cl. ...................................... 358/105; 358/31
[58] Field of Search ....................... 358/105, 31, 36, 37

[56] References Cited
U.S. PATENT DOCUMENTS
4,794,454 12/1988 Sugiyama et al. ................... 358/105
4,811,092 3/1989 Achiha et al. ....................... 358/105

*Primary Examiner*—James J. Groody
*Assistant Examiner*—Victor R. Kostak
*Attorney, Agent, or Firm*—Alvin Sinderbrand

[57] ABSTRACT

A circuit for detecting motion of a color video signal includes serially-connected first and second frame memories for storing the video signal frame-by-frame. First and second difference video signals are produced which respectively correspond to the difference between the input and output signals of the first frame memory and the difference between the input and output signals of the second frame memory, whereupon first and second absolute values are generated in response to the first and second difference video signals, respectively. Such first and second absolute values are employed for detecting first and second correlation patterns of the first and second difference video signals, respectively, and then motion of the video signal is discriminated on the basis of the detected correlation patterns.

7 Claims, 3 Drawing Sheets

FIG. 1
(PRIOR ART)
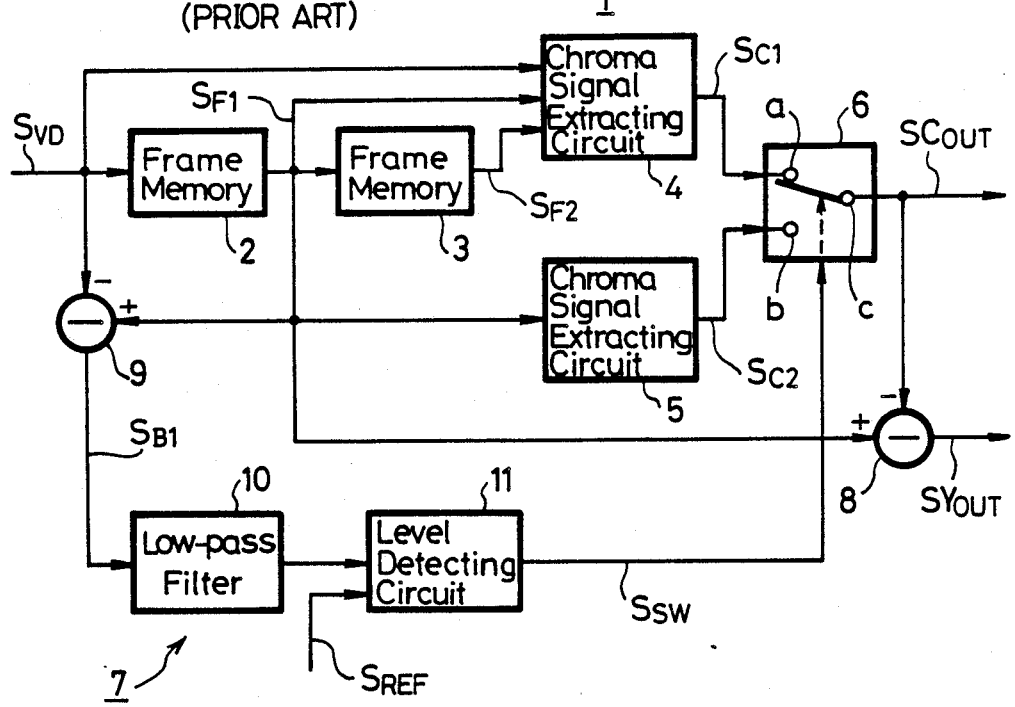
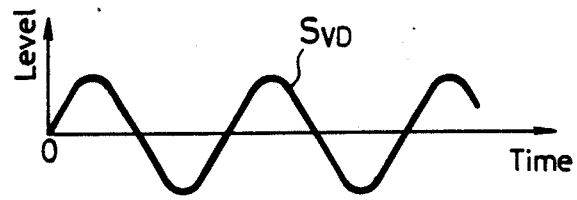
FIG. 3A
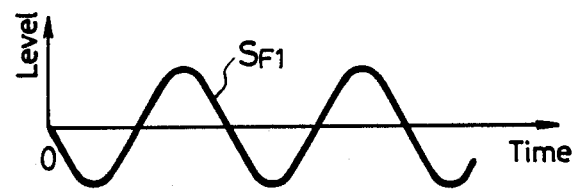
FIG. 3B
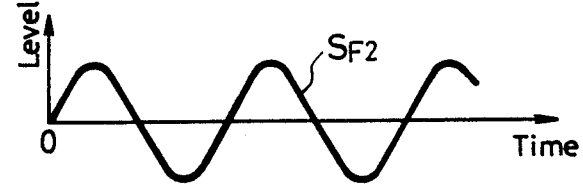
FIG. 3C

CIRCUIT FOR DETECTING MOTION IN A VIDEO SIGNAL ON THE BASIS OF DETECTED CORRELATION PATTERNS

BACKGROUND OF THE INVENTION

1. Field of the Invention

The present invention relates generally to a circuit for detecting motion of a color video signal and, more particularly, is directed to a motion detecting circuit adapted for use with a luminance/chrominance (Y/C) separating circuit which separates chrominance and luminance signal components of a color video signal.

2. Description of the Prior Art

In a Y/C separating circuit according to the prior art, a motion detecting circuit is used to detect motion of a color video signal and, on the basis of such detected motion, or lack thereof, either a chroma signal extracting circuit suitable for a moving picture mode or a chroma signal extracting circuit suitable for a still picture mode is selectively employed. In the Y/C separating circuit according to the prior art, the color video signal is supplied to serially-connected first and second frame memories and, for the purposes of motion detection, the color video signal is subtracted from the output signal of the first frame memory to provide a subtracted output supplied through a low-pass filter to a level detecting circuit. Such level detecting circuit compares the mentioned subtracted output with a predetermined reference level. When the level of the subtracted output is lower than the predetermined reference level, the level detecting circuit determines that the color video signal has no motion and, in response thereto, a switching circuit selects the output of the chroma signal extracting circuit suitable for the still picture mode. On the other hand, when the subtracted output applied to the level detecting circuit is higher than the predetermined reference level, the level detecting circuit determines that the color video signal contains motion and causes the switching circuit to select the output of the chroma signal extracting circuit suitable for the moving picture mode.

However, the above described motion detecting circuit according to the prior art has relatively low sensitivity for detecting motion in a color video signal representing a scene having relatively small variations of brightness, for example, if a moving object in a picture has substantially the same luminance as the background, or for detecting movement of a so-called edge-defining signal which is inherently of high frequency. Although it has been suggested to avoid the foregoing problems by lowering the reference level employed in the level detecting circuit and thereby increasing the motion detecting sensitivity, such proposal is not considered effective because then noise components in the incoming color video signal result in erroneously detected motion.

OBJECTS AND SUMMARY OF THE INVENTION

Accordingly, it is an object of the present invention to provide an improved motion detecting circuit which can avoid the above mentioned disadvantages inherent in the prior art.

More specifically, it is an object of the present invention to provide a motion detecting circuit of high sensitivity which can efficiently and reliably detect motion of a color video signal.

It is another object of the present invention to provide a motion detecting circuit, as aforesaid, which is particularly applicable to a Y/C separating circuit for reliably and satisfactorily achieving separation of luminance and chrominance signals in a color video signal.

It is still another object of the present invention to provide a motion detecting circuit, as aforesaid, which can be applied to a wide variety of color video signal processing circuits, such as, a noise detecting circuit for a color video signal and the like.

According to an aspect of the present invention, a motion detecting circuit for detecting motion of a video signal comprises serially-connected first and second frame memories for storing the video signal frame-by-frame; means for producing first and second difference video signals respectively corresponding to the difference between input and output signals of the first frame memory and the difference between input and output signals of the second frame memory; means for generating first and second absolute values in response to the first and second difference video signals, respectively; means receiving the first and second absolute values and being responsive thereto for detecting first and second correlation patterns of the first and second difference video signals; and means receiving the detected correlation patterns for discriminating motion of the video signal on the basis thereof.

The above, and other objects, features and advantages of the invention, will be apparent in the following detailed description of a preferred embodiment of the invention when read in conjunction with the accompanying drawings in which the same or corresponding parts are identified by the same reference numerals in the several views.

BRIEF DESCRIPTION OF THE DRAWINGS

FIG. 1 is a block diagram showing a Y/C separating circuit including a motion detecting circuit according to the prior art;

FIGS. 3A, 3B and 3C are waveforms to which reference will be made in explaining the operation of the motion detecting circuit according to the invention;

DETAILED DESCRIPTION OF A PREFERRED EMBODIMENT

Figure 2:
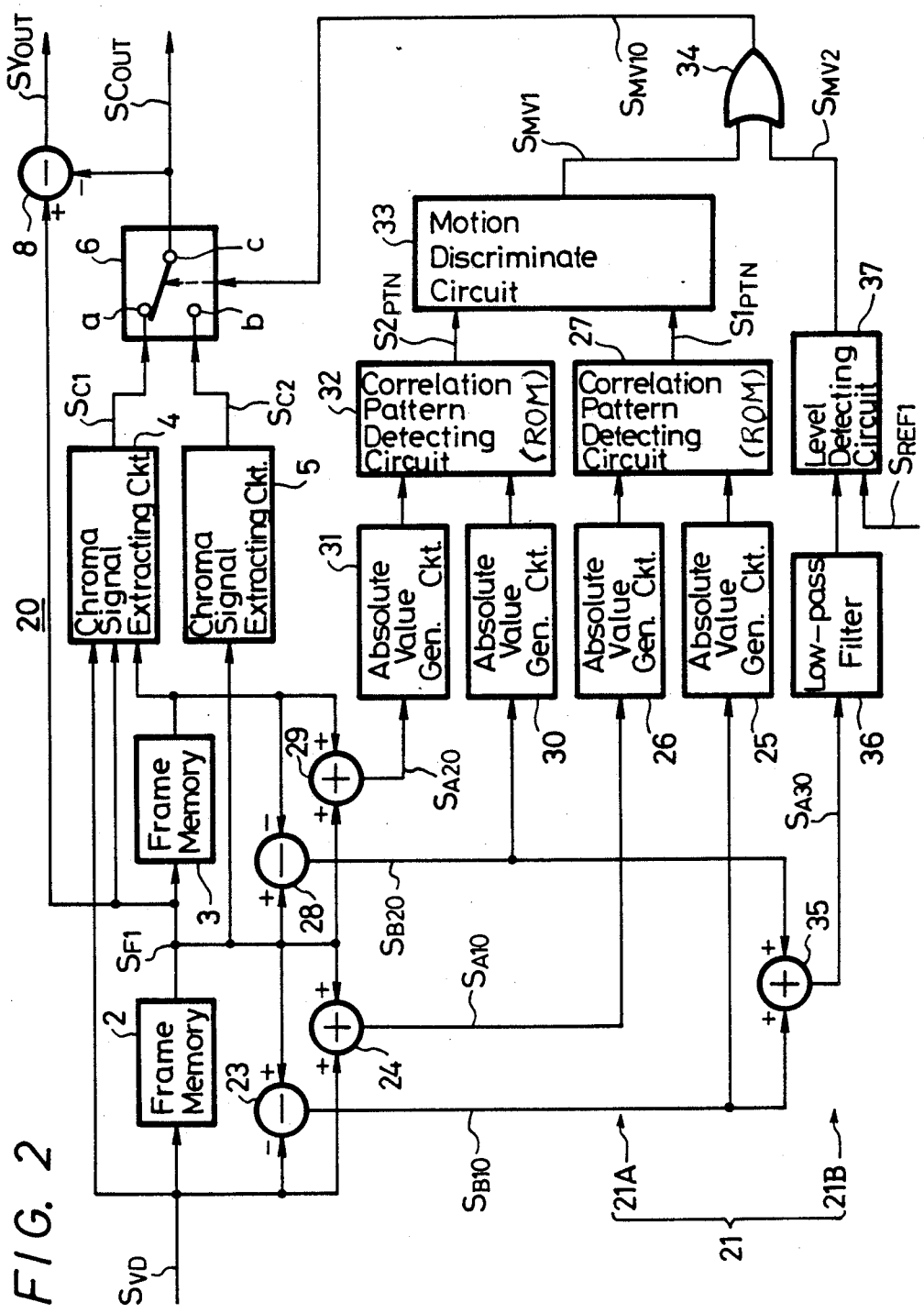
FIG. 2 is a block diagram showing a Y/C separating circuit employing a motion detecting circuit according to an embodiment of the present invention.

In order that the problems overcome by the present invention may be more fully understood, a Y/C separating circuit according to the prior art will be initially described in detail with reference to FIG. 1. In the Y/C separating circuit 1 of FIG. 1, a color video signal $S_{VD}$ is supplied to serially-connected first and second frame memories 2 and 3. The color video signal $S_{VD}$ and the output signals $S_{F1}$ and $S_{F2}$ from the first and second frame memories 2 and 3, respectively, are supplied to a chroma signal extracting circuit 4 which is particularly suitable for a still picture mode. The output signal $S_{F1}$ of the first frame memory 2 is also supplied to a second chroma signal extracting circuit 5 which is particularly suitable for a moving picture mode.

In the chroma signal extracting circuit 4, the output signal $S_{F1}$ of the first frame memory 2 is suitably multiplied by, for example, the coefficient $\frac{1}{2}$, the color video signal $S_{VD}$ is multiplied by the coefficient $\frac{1}{4}$ and the output signal $S_{F2}$ of the second frame memory 3 is multiplied by the coefficient $\frac{1}{4}$. Then, the first chroma signal extracting circuit 4 suitably extracts the resulting color video signal $S_{VD}$ and output signal $S_{F2}$ from the output signal $S_{F1}$ so as to obtain a chroma signal of the frame period which is suitable for a still picture mode, and which is identified on FIG. 1 as the extracted chroma signal $SC_1$.

The second chroma signal extracting circuit 5 is suitably formed of a band-pass filter or a comb-filter (not shown) having a frequency band corresponding to the frequency band of a subcarrier which results from modulating a chroma signal. The second chroma signal extracting circuit 5 thereby extracts a chroma signal of a field which is identified as the extracted chroma signal $SC_2$. It will be appreciated that, in the moving picture mode, the second chroma signal extracting circuit 5 can satisfactorily extract a chroma signal but, in the still picture mode, the second chroma signal extracting circuit 5 cannot extract a chroma signal as effectively as the first chroma signal extracting circuit 4. Thus, the first and second extracted chroma signals $SC_1$ and $SC_2$ from the circuits 4 and 5, respectively, are desirably used selectively when the color video signal $S_{VD}$ represents a still picture and a moving picture, respectively. For effecting such selection, the signals SC, and $SC_2$ are supplied to respective input terminals a and b of a switching circuit 6. In response to the logic level of a switching signal $S_{SW}$ from a motion detecting circuit 7, a moving contact c of the switching circuit 6 is changed-over for selectively engaging one or the other of the contacts a and b. More specifically, when the switching signal $S_{SW}$ is at a low level, that is, at a logic level [L], the movable contact c of switching circuit 6 is made to engage the contact a so that the first extracted chroma signal $SC_1$ is obtained as the output chroma signal $SC_{OUT}$. On the other hand, when the switching signal $S_{SW}$ is at a high level, that is, a logic level [H], movable contact c is made to engage the contact b of switching circuit 6 so that the second extracted chroma signal $SC_2$ is thereby selected as the output chroma signal $SC_{OUT}$. The selectively determined output chroma signal $SC_{OUT}$ is shown to be supplied to a first subtracting circuit 8 in which it is subtracted from the output signal $S_{F1}$ of the first frame memory 2 for producing an output luminance signal $SY_{OUT}$ at the output of the subtracting circuit 8.

In the illustrated motion detecting circuit 7 according to the prior art, the input color video signal $S_{VD}$ is subtracted from the output signal $S_{F1}$ of the first frame memory 2 in a second subtracting circuit 9 to provide a subtracted output $S_{B1}$ which is supplied through a low-pass filter 10 to a level detecting circuit 11. The level detecting circuit 11 compares the incoming subtracted output $S_{B1}$ with a predetermined reference level $S_{REF}$. It will be appreciated that the subtracting circuit 9, in effect, provides a pixel-by-pixel comparison between adjacent frames. In other words, if there is no motion in the color video signal $S_{VD}$, the level of the luminance signal, at any particular pixel, is about the same from one frame to the next, so that the subtracted output $S_{B1}$ from the subtracting circuit 9 will be low. When the level of the subtracted output $S_{B1}$ is lower than the predetermined reference level $S_{REF}$, the level detecting circuit 11 concludes therefrom that the color video signal $S_{VD}$ contains no motion, and provides a switching signal $S_{SW}$ with the logic level [L] to the switching circuit 6 so that, as shown on FIG. 1, movable contact c engages fixed contact a of switching circuit 6 for supplying the first extracted chroma signal $SC_1$ as the output chroma signal $SC_{OUT}$. On the other hand, when there is a substantial difference in the level of the luminance signal at any particular pixel from one frame to the next, for example, as when there is substantial movement in the color video signal $S_{VD}$, the level of the subtracted output $S_{B1}$ from subtracting circuit 9 is raised or made higher than the predetermined reference level $S_{REF}$. As a result of the foregoing, the level detecting circuit 11 determines that the color video signal $S_{VD}$ contains motion, and the level detecting circuit 11 supplies the switching signal $S_{SW}$ with a relatively high logic level [H] so that the switching circuit 6 is changed-over to engage its movable contact c with the fixed contact b, and thereby supplies the second extracted chroma signal $SC_2$ as the output chroma signal $SC_{OUT}$.

Thus, in the Y/C separating circuit 1 of FIG. 1, motion of the color video signal $S_{VD}$ is intended to be detected by the motion detecting circuit 7 according to the prior art and, on the basis of such detection, the first chroma signal extracting circuit 4 particularly adapted for the still picture mode or the second chroma signal extracting circuit 5 particularly adapted for the moving picture mode is selected as the source of the output chroma signal $SC_{OUT}$.

However, in the motion detecting circuit 7 according to the prior art, the motion of the color video signal is detected on the basis of the difference between the luminance signal components at corresponding pixels of successive frames. In other words, the motion is detected only on the basis of the relatively low frequency components that pass through the low-pass filter 10 and from which the high frequency band components, such as, the subcarrier of the chroma signal, have been eliminated. Therefore, the motion detecting circuit 7 according to the prior art has relatively low sensitivity for detecting motion in a color video signal representing a scene having relatively small variations of brightness, such as, when a moving object in a picture has substantially the same luminance or brightness as the background, or for detecting movement of a contour or edge-defining signal which inherently is of high frequency.

Referring now to FIG. 2, it will be seen that, in a Y/C separating circuit 20 which includes a motion detecting circuit 21 according to an embodiment of the present invention, the parts or components corresponding to those described above with reference to FIG. 1 are identified by the same reference numerals and will not be further described in detail at this time.

The motion detecting circuit 21 is shown to be comprised of a first motion detecting section 21A and a second motion detecting section 21B. The first motion detecting section 21A detects motion of a color video signal through the use of the frequency-interleaved relationship of a chroma signal having a high frequency component and a luminance signal having a low frequency component, while the second motion detecting section 21B detects motion of a low frequency component and thus, for example, may be similar to the motion detecting circuit 7 according to the prior art, as illustrated in FIG. 1. By reason of the foregoing, the Y/C separating circuit 20 can always achieve a satisfactory separation of the luminance signal and the chrominance signal.

More specifically, in the first motion detecting section 21A of the motion detecting circuit 21 embodying this invention, the color video signal $S_{VD}$ and the output signal $S_{F1}$ of the first frame memory 2 are subtracted from each other in a subtracting circuit 23 and are added to each other in an adding circuit 24. A subtracted output $S_{B10}$ from the subtracting circuit 23 and an added output $S_{A10}$ from the adding circuit 24 are supplied to absolute value generating circuits 25 and 26, respectively, which, in effect, generate a signal level representing the average Y level of several pixels or the average C level of several pixels, depending upon whether a Y or C signal is supplied thereto. The outputs of the absolute value generating circuits 25 and 26 are supplied to a correlation pattern detecting circuit 27 which may be in the form of a lookup table or ROM. The output signals $S_{F1}$ and $S_{F2}$ of the first and second frame memories 2 and 3, respectively, are subtracted from each other in a subtracting circuit 28, and added to each other in an adding circuit 29. A subtracted output $S_{B20}$ and an added output $S_{A20}$ are supplied from subtracting circuit 28 and adding circuit 29 to absolute value generating circuits 30 and 31, respectively. The absolute value generating circuits 30 and 31 have respective outputs applied to a second correlation pattern detecting circuit 32 which, similarly to the first correlation pattern detecting circuit 27, may be in the form of a look-up table. It will be appreciated that the output of the circuit 27 represents the correlation between the present and preceding frames, whereas, the output of the circuit 32 represents the correlation between a preceding frame and the second or next preceding frame.

When the color video signal $S_{VD}$ applied to the Y/C separating circuit 20 contains no motion, that is, represents a still picture, the phase of the luminance signal is the same as the phase of the input color video signal $S_{VD}$ and of the output signals $S_{F1}$ and $S_{F2}$ of the first and second frame memories 2 and 3, respectively. On the other hand, the phase of the chroma signal is the same as the phase of the input color video signal $S_{VD}$ (FIG. 3A) and the phase of the output signal $S_{F2}$ (FIG. 3C) of the second frame memory 3, while the phase of the chroma signal of the output signal $S_{F1}$ (FIG. 3B) of the first frame memory 2 is opposite to those indicated on FIGS. 3A and 3C, that is, the phases of the color video signal $S_{VD}$ and of the output signal $S_{F2}$.

Utilizing the above noted features of the chroma signal and the luminance signal, the first correlation pattern detecting circuit 27 is supplied with the subtracted output $S_{B10}$, whose main component is the chroma signal contained in the color video signal $S_{VD}$ and the output signal $S_{F1}$ of the first frame memory 2, and with the added output $S_{A10}$ whose main component is the luminance signal. Similarly, the second correlation pattern detecting circuit 32 is supplied with the subtracted output $S_{B20}$, whose main component is the chroma signal contained in the output signals $S_{F1}$ and $S_{F2}$ of the first and second frame memories 2 and 3, and with the added output $S_{A20}$ whose main component is the luminance signal.

Figure 4:
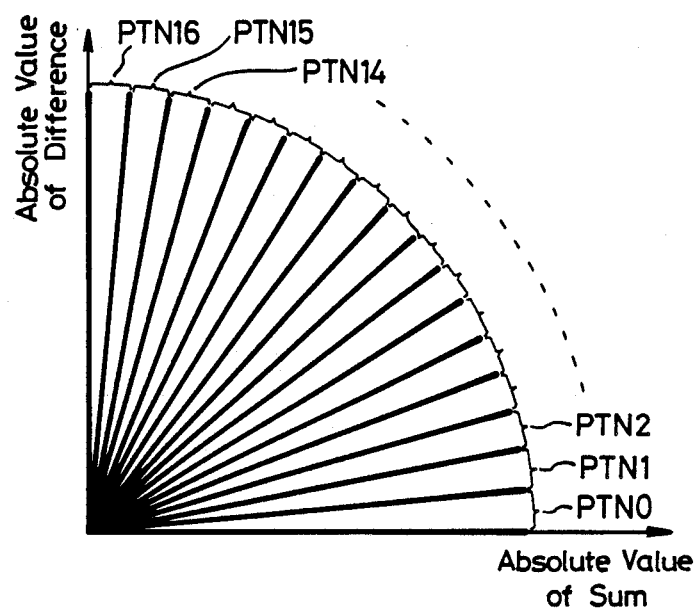
FIG. 4 is a schematic diagram of a correlation pattern between absolute values of sum and difference, and to which reference will be made in explaining the present invention.

The first and second correlation pattern detecting circuits 27 and 32 are conveniently each formed of a read only memory (ROM) in which correlation pattern values PTN0, PTN1, PTN2, ---, PTN16 are stored in tables having addresses on the abscissa indicated by absolute values of the added output $S_{A10}$ or $S_{A20}$, while addresses on the ordinate are indicated by absolute values of the subtracted output $S_{B10}$ or $S_{B20}$, as shown in FIG. 4. The correlation pattern detecting circuits 27 and 32 respectively provide first and second correlation pattern values $S1_{PTN}$ and $S2_{PTN}$ from mean absolute values of the input subtracted outputs $S_{B10}$ and $S_{B20}$, respectively, for a predetermined period, and from mean absolute values of the input added outputs $S_{A10}$ and $S_{A20}$, respectively, for the predetermined period. Such first and second correlation pattern values $S1_{PTN}$ and $S2_{PTN}$ are shown to be supplied to a motion discriminating circuit 33 which is also desirably in the form of a look-up table, and which determines, on the basis of the first and second correlation pattern values $S1_{PTN}$ and $S2_{PTN}$, whether the color video signal $S_{VD}$ represents a still picture or a moving picture.

Figure 5:
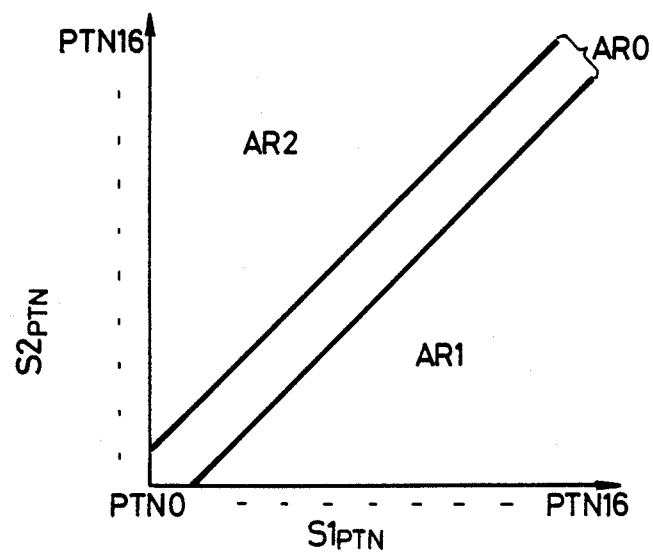
FIG. 5 is a schematic diagram of a motion discriminating pattern to which reference will be made in explaining the operation of a motion discriminating circuit included in the motion detecting circuit embodying the present invention.

More specifically, and as shown graphically on FIG. 5 in which the first correlation pattern value $S1_{PTN}$ is plotted on the abscissa and the second correlation pattern $S2_{PTN}$, is plotted on the ordinate, when the coordinates of the first and second correlation pattern values supplied to the circuit 33 are located in a central still picture area indicated at ARO, the motion discriminating circuit 33 determines that the color video signal $S_{VD}$ represents a still picture. On the other hand, when the coordinates of the first and second correlation pattern values $S1_{PTN}$ and $S2_{PTN}$ applied to the motion discriminating circuit 33 are located in one or the other of the areas AR1 and AR2 on FIG. 5, the motion discriminating circuit 33 determines that the color video signal $S_{VD}$ represents a moving picture and, in accordance with such determination, supplies a first motion detecting signal $S_{MV1}$ to an OR gate circuit 34. Such first motion detecting signal $S_{MV1}$ is provided with a low logic level [L] in the case of a still picture mode, and with a high logic level [H] in the case of a moving picture mode.

The first motion detecting section 21A can, as earlier noted, detect the motion of a colored object, and also is sensitive to the subtle motion of an object with little contrast from its background, such as, the motion of an object which has substantially the same brightness as the background. However, the first and second correlation pattern values $S1_{PTN}$ and $S2_{PTN}$ are about the same if a scene represented by the color video signal $S_{VD}$ includes a quick reciprocal movement, such as, the movement of a pendulum, which results in the input color video signal $S_{VD}$ and the output $S_{F2}$ from the second frame memory 3 being substantially the same at any particular pixel. As a result of the foregoing, the motion discriminating circuit 33 will not detect such rapid reciprocal movement, that is, the motion discriminating circuit 33 will misinterpret the substantially equal first and second correlation pattern values $S1_{PTN}$ and $S2_{PTN}$ as indicating a color video signal without motion.

In order to avoid the foregoing failure to detect motion and to indicate the same at the output of discriminating circuit 33, the motion detecting circuit 21 further includes the second motion detecting section 21B which is somewhat similar to the motion detecting circuit 7 according to the prior art, and which is shown to include an adding circuit 35 adding together the outputs $S_{B10}$ and $S_{B20}$ of the subtracting circuits 23 and 28, respectively, and providing a resulting added output $S_{A30}$ which is supplied through a low pass filter 36 to a level detecting circuit 37.

The level detecting circuit 37 compares, with a predetermined reference level $S_{REF1}$, the low frequency or luminance signal component of the added output $S_{A30}$ of the adding circuit 35 which, in effect, adds to the output signal $S_{F1}$ of the first frame memory 2 the difference between the color video signals $S_{VD}$ and $S_{F2}$ for the frames that precede and succeed, respectively, the frame of the output signal $S_{F1}$. When the low frequency or luminance signal component of the added output $S_{A30}$ which passes through the filter 36 is lower than the predetermined reference level $S_{REF1}$, the level detecting circuit 37 concludes that the color video signal $S_{VD}$ represents a still picture and supplies a second motion detecting signal $S_{MV2}$ of low logic level [L] to the OR gate circuit 34. On the other hand, if the low frequency or luminance signal component of the added output $S_{A30}$ applied to the level detecting circuit 37 is higher than the reference level $S_{REF1}$, the level detecting circuit 37 concludes therefrom that the color video signal $S_{VD}$ represents a moving picture and, accordingly, provides the second motion detecting signal $S_{MV2}$ with a high logic level [H].

Since the second motion detecting section 21B detects the motion of the luminance signal component of the color video signal $S_{VD}$, it is possible to positively detect a reciprocating motion represented by the color video signal $S_{VD}$, such as, the movement of a clock pendulum which, for example, may occupy the position at one end of its swinging movement in a particular frame and occupies the position at the other end of its swinging movement in the frames that precede and succeed that particular frame.

It will be apparent that the OR gate circuit 34 supplies to the switching circuit 6 motion detecting signal $S_{MV10}$ which is the logical sum of the first and second motion detecting signals $S_{MV1}$ and $S_{MV2}$ from the first and second motion detecting sections 21A and 21B. As a result of the foregoing, the Y/C separating circuit 20 can effect precise motion detection with high sensitivity and, therefore, the luminance and chrominance signal components can always be satisfactorily separated from the color video signal.

More specifically, in the above described motion detecting circuit 21 according to an embodiment of this invention, the efficient and highly sensitive detection of the motion of a color video signal results from the fact that such detection is effected on the basis of correlation patterns of absolute values of sums and differences of the color video signal for a present frame and for the next preceding and succeeding frames, respectively.

Although, in the above described embodiment, the correlation patterns of absolute values of sums and differences of the color video signal for the present frame and for the next preceding and succeeding frames, respectively, are detected and then such detected correlation patterns are used for determining whether or not the color video signal contains motion, similar advantageous effects can be achieved if absolute values of differences between the color video signal for the present frame and for the next preceding and succeeding frames, respectively, are compared and the change of the chrominance signal or component in the color video signal is detected therefrom for determining whether or not motion is contained in the color video signal.

Although the motion detecting circuit embodying the present invention has been specifically described as applied to a Y/C separating circuit 20, it is to be appreciated that the present invention is not limited in its application to Y/C separating circuits, but can find wide application in color video signal processing circuits, such as, a circuit for detecting noise in a color video signal, and the like.

Since according to this invention the absolute values of the differences between the color video signal for the present frame and for the next preceding and succeeding frames are compared and the change of the chrominance signal contained in the color video signal is detected, it is possible to provide a circuit which reliably and sensitively detects motion of a color video signal and distinguishes the same from other similar phenomena, such as noise.

Although a single preferred embodiment of the invention has been described in detail herein with reference to the accompanying drawings, it is to be understood that the invention is not limited to that precise embodiment, and that various changes and modifications may be effected therein by one skilled in the art without departing from the scope and spirit of the invention as defined in the appended claims.

What is claimed is:

1. A motion detecting circuit for detecting motion of a video signal, comprising:
   serially-connected first and second frame memories for storing the video signal frame-by-frame;
   means for producing first and second difference video signals respectively corresponding to the difference between input and output signals of said first frame memory and the difference between input and output signals of said second frame memory;
   means for generating first and second absolute values in response to said first and second difference video signals, respectively;
   means receiving said first and second absolute values and being responsive thereto for detecting first and second correlation patterns of said first and second difference video signals; and
   means receiving the detected correlation patterns for discriminating motion of the video signal on the basis thereof.

2. A motion detecting circuit according to claim 1; further comprising means for detecting a motion of said video signal by detecting a difference between said first and second difference video signals.

3. A motion detecting circuit according to claim 2; in which each of said first and second difference video signals includes chrominance and luminance difference signals.

4. A motion detecting circuit according to claim 3; in which said means for generating first and second absolute values includes, for each of said first and second absolute values, an absolute value circuit for the respective difference luminance signal and an absolute value circuit for the respective difference chrominance signal.

5. A motion detecting circuit according to claim 4; in which said means for detecting first and second correlation patterns includes means for detecting a correlation between the difference luminance and difference chrominance signals of said first and second difference video signals, respectively.

6. A motion detecting circuit according to claim 5; in which said means for detecting said first and second correlation patterns include a read only memory (ROM).

7. A motion detecting circuit according to claim 6; in which said absolute values of said luminance and chrominance signals of said first and second difference video signals are used as address signals for said read only memory of said means for detecting said first and second correlation patterns.

* * * * *